United States Patent [19]

Hardee

[11] Patent Number: 4,986,307

[45] Date of Patent: Jan. 22, 1991

[54] ROTARY PNEUMATIC VALVE

[75] Inventor: Harry C. Hardee, Albuquerque, N. Mex.

[73] Assignee: The United States of America as represented by the United States Department of Energy, Washington, D.C.

[21] Appl. No.: 387,913

[22] Filed: Aug. 2, 1989

[51] Int. Cl.⁵ .............................................. F16K 11/07
[52] U.S. Cl. ............................ 137/625.19; 137/625.47; 137/624.13
[58] Field of Search ...................... 137/625.19, 625.23, 137/625.24, 625.47, 624.14, 624.13

[56] References Cited

U.S. PATENT DOCUMENTS

| 1,571,810 | 2/1926 | Shimp | 137/625.19 X |
| 2,309,137 | 1/1943 | Peterlein | 137/625.19 X |
| 3,046,956 | 7/1962 | Kuljian | 137/625.19 X |
| 3,165,096 | 1/1965 | Langdon | 137/625.19 X |
| 4,805,727 | 2/1989 | Hardee et al. | 181/106 |

OTHER PUBLICATIONS

Blackburn et al., "Fluid Power Control", Chapter 9, The M.I.T. Press, 1960, pp. 242 and 274.

Primary Examiner—Alan Cohan
Attorney, Agent, or Firm—Anne D. Daniel; James H. Chafin; William R. Moser

[57] ABSTRACT

A rotary pneumatic valve which is thrust balanced and the pneumatic pressure developed produces only radial loads on the valve cylinder producing negligible resistance and thus minimal torque on the bearings of the valve. The valve is multiplexed such that at least two complete switching cycles occur for each revolution of the cylinder spindle.

4 Claims, 2 Drawing Sheets

ROTARY PNEUMATIC VALVE

BACKGROUND OF THE INVENTION

This invention relates to a pneumatic valve and more specifically to a rotary pneumatic valve for high-frequency, low-torque applications. The Government has rights in this invention pursuant to Contract No. DE-AC04-76DP00789 awarded by the U.S. Department of Energy to AT&T Technologies, Inc.

Common pneumatic valves are usually of the spool or plate type. Occasionally, rotating-cylinder plug valves are used for special applications. Rotating-cylinder valves are adaptable for high-frequency pneumatic switching situations where the valve is to be driven by an electric motor or pneumatic turbine. In the application of a simple cylindrical plug valve, torque requirements and size limitations are not generally considered to be a primary concern. In the case of the typical rotary pneumatic valve, however, and particularly in an application such as a downhole seismic source, necessarily there are design restrictions imposed on the typical rotary pneumatic valve. For example, there is a severe restriction on overall valve diameter imposed by the bore hole diameter in which the tools implemented operate. Thus, a design problem is encountered for high-frequency operation because small diameter, high-speed electric motors have very limited torque capability. Further, the cylindrical valve and all pneumatic lines to and from the valve must be aligned in parallel to the axis of the bore hole to conserve space in the small bore holes. A further requirement for rotary pneumatic valves in downhole seismic source application is that flow multiplexing, i.e. more than one pneumatic cycle per rotation of the valve cylinder, is frequently required to achieve the necessary high switching frequencies or cycle rates.

SUMMARY OF THE INVENTION

It is, therefore, an object of the present invention to provide a rotary valve for high-frequency, low-torque applications which will overcome the above-noted disadvantages.

Still a further object of the present invention is to provide a rotary valve for high-frequency, low-torque applications which valve is multiplexed and which is provided with at least two sets of repeated switching cycles per rotation of the spindle shaft of the valve.

Another object of the present invention is to provide a pneumatic rotary valve having a pneumatic switching rate which is at least twice the rotational speed of the electric motor that drives the valve.

Yet another object of the present invention is to provide a rotary pneumatic valve for high-frequency, low-torque application having inlet and exhaust ports angled in the direction of rotation of the valve cylinder so as to produce a torque which aids the electric motor.

The foregoing objects and others are accomplished in accordance with the present invention, generally speaking by providing a rotary pneumatic valve having multiplexing capability in that at least two complete switching cycles occur for every rotation of the cylinder or spindle component of the valve. This permits the pneumatic switching rate to be twice the rotational speed of an electric motor which drives the valve. Pneumatic pressure appears to have only a minor effect on the maximum valve frequency. In a further embodiment of the present invention the rotary pneumatic valve is provided with inlet and exhaust ports angled in the direction of rotation of the cylinder to produce a torque that aids the electric motor which drives the valve.

Brief Description of the Drawings

The invention is further illustrated by the accompanying drawings wherein.

DETAILED DESCRIPTION OF THE INVENTION

Figure 1:
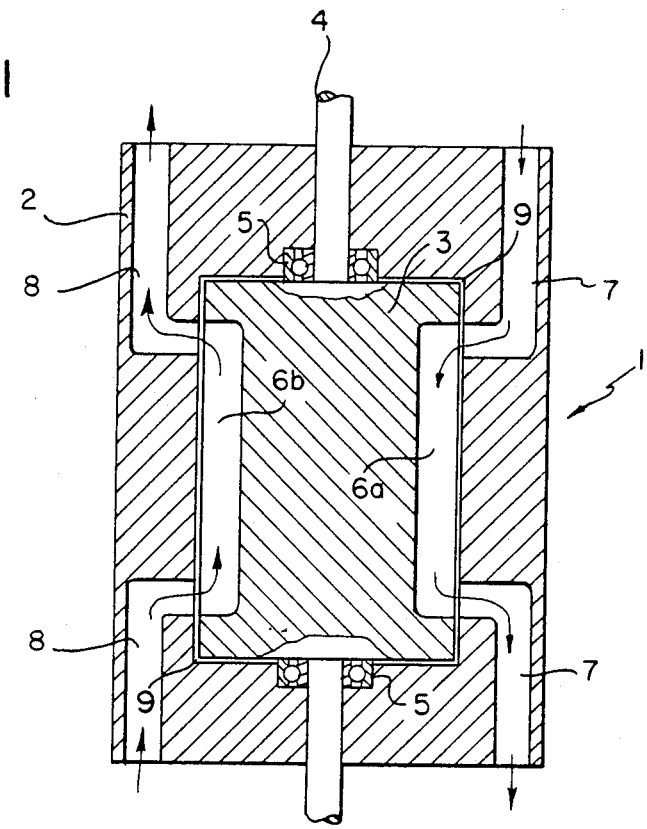
FIG. 1 represents a schematic side sectional view of the rotary pneumatic valve of the present invention.

Referring now to FIG. 1, there is seen the rotary pneumatic valve of the present invention generally designated 1 comprising a housing 2 and a cylindrical slotted spindle 3. A spindle shaft 4 provided with bearings 5 connects the cylindrical spindle 3 to an electric motor (not shown). In the case of the present illustration, the cylindrical spindle 3 is provided with at least one pair of opposing slots 6a and 6b. As stated, the cylindrical spindle 3 of the rotary valve is rotated by a high-speed electric motor or other rotary power source such as a pneumatic turbine. The spindle 3 is positioned inside the housing 2 having a series of right angle ports 7 and 8 which serve as pairs of opposing conduits for inlet and exhaust gases which flow through the spindle slots when the slots are appropriately aligned with the corresponding ports. A small clearance or gas gap 9 surrounds top and bottom portions of cylindrical spindle 3, separating spindle 3 from housing 2 except in the areas where spindle slots 6a and 6 b align with ports 7 and 8 of the housing to allow gas flow through the slots; this clearance 9 receives a portion of the gas flow entering and exiting ports 7 and 8. Inlet gas from a pressurized source (not shown) flows as indicated by the arrows into and out of conduit 7, through the aligned slot 6a, to a pneumatic accessory, such as a piston. Exhaust gas from the pneumatic accessory (not shown) is returned to the valve into and out of the conduit 8 through the aligned slot 6b, as indicated by the arrows, to a collection tank or the atmosphere.

Figure 2:
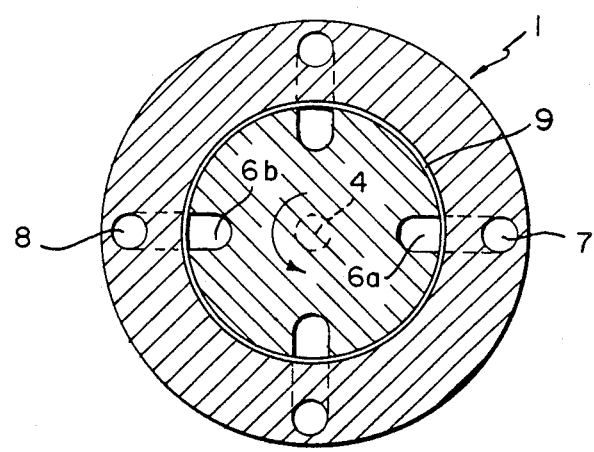
FIG. 2 represents an end view of the rotary pneumatic valve of FIG. 1.

FIG. 2 represents an end view of the valve of FIG. 1. In the end view of FIG. 2, the exhaust conduit 8 is represented as being at the nine o'clock position, aligned with the spindle slot 6b. Similarly, the inlet conduit 7 is shown at the three o'clock position corresponding to slot 6a. Because of the alignment of the spindle slots at this rotation, no gas flows in the conduits at the six or twelve o'clock positions. Flow will commence, however, at these positions when the spindle shaft rotates the cylinder 90 degrees. This process is repeated three times at each opposing set of conduits as the cylindrical spindle continues to rotate by 90 degree increments. Thus, the process will repeat a total of four times by the time the spindle rotates one full turn. It is this action of more than one set of repeated switching cycles per rotation of the spindle shaft which is referred to as multiplexing. A valve as represented by FIGS. 1 and 2 has four complete switching cycles per rotation of the spindle shaft. This allows the pneumatic switching rate to be four times the rotational speed of the electric motor that drives the valve. If, for example, the conduits at the twelve o'clock and six o'clock positions were to be eliminated, then the valve would only give rise to two switching cycles per rotation. Similarly, the number of conduits can be increased as desired by placing inlet and exhaust conduit pairs at the one and seven o'clock positions, two and eight o'clock positions, four and ten o'clock positions, and five and eleven o'clock positions, thereby producing twelve switching cycles per rotation.

Because the gas entry and exit paths from the spindle slots, as seen in the side sectional view of FIG. 1, are at right angles to the spindle shaft, the load is easily carried by the spindle bearings 5. The pneumatic valve of the present invention is thus able to operate at high speeds because the drag or resisting torque of the gas switching process is very low.

Figure 3:
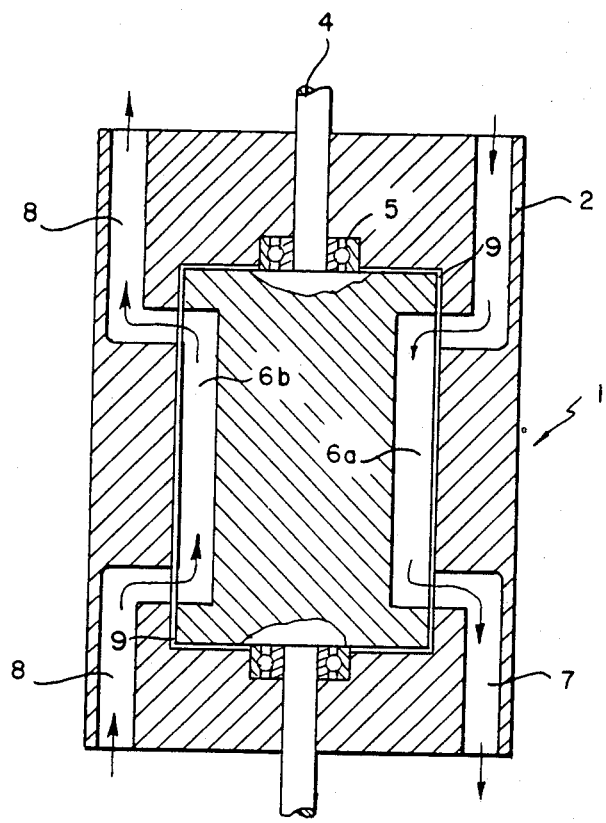
FIG. 3 represents a side sectional view of an alternate embodiment of the rotary pneumatic valve of the present invention.
Figure 4:
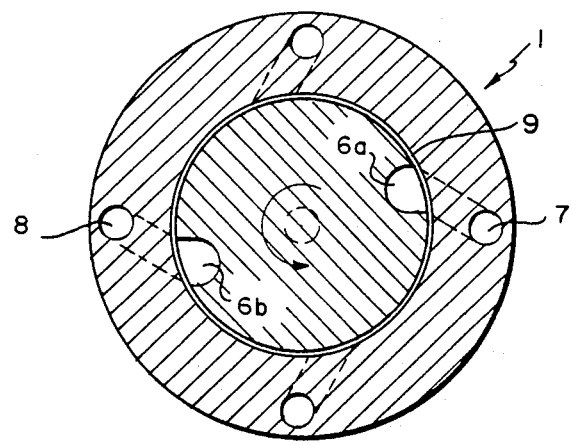
FIG. 4 represents an end view of the rotary pneumatic valve of FIG. 3.

FIGS. 3 and 4 represent an alternate embodiment of the present invention wherein the conduits in the housing of the valve that direct the gas to the slots in the spindle are designed to have a tangential component relative to the spindle axis, as shown more clearly in FIG. 4. This allows some of the gas momentum to help drive the spindle in the direction of rotation to offset any resisting drag or resisting frictional torque due to the bearings, or to gas viscous drag in the small clearance 9 between the spindle 3 exterior and the housing 2 interior. This small clearance does cause some viscous frictional drag due to gas in this small gap 9, but gap 9 is held to a minimum, about 0.00075 inches or less, except in the areas where opposing slots 6a and 6b align with ports 7 and 8 of the housing 2 to allow flow of gas, in order to prevent excessive gas leakage around the spindle to other conduits in some undesirable fashion.

A valuable feature of the novel valve of the present invention is that the inlet and exhaust ports can be angled in the direction of rotation to produce a torque that aids the electric motor. This is represented as discussed above with respect to FIGS. 3 and 4.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A rotary valve for high-frequency, low-torque application, comprising:
   a housing including at least one pair of opposing gas inlet and gas exhaust conduits,
   a valve spindle having at least one bearing at each of first and second ends thereof and provided with at least one pair of opposing slots which upon rotation align with said inlet and exhaust gas conduits respectively,
   a gap between the interior of said housing and the exterior of said spindle, maintained by said bearings, for separating said spindle from said housing and for centering said spindle inside said housing, and
   a spindle shaft for rotating said valve spindle,
   wherein said alignment of said at least one pair of gas inlet and gas exhaust conduits in said housing and said at least one pair of opposing slots in said valve spindle occurs sequentially in response to rotations of said valve spindle such that said rotary valve provides at least two complete switching cycles for every rotations of said valve spindle.

2. The rotary valve of claim 1, wherein said inlet and exhaust conduits from said housing to said valve spindle are slanted in the direction of rotation to provide a tangential moment which imparts a torque component to assist rotation of said valve spindle.

3. The rotary valve of claim 1, wherein said clearance is about 0.00075 inches.

4. The rotary valve of claim 1, wherein said
   housing includes at least six pairs of gas inlet and gas exhaust conduits; and
   said alignment of said at least six pairs of gas inlet and gas exhaust conduits in said housing and said at least one pair of opposing slots in said valve spindle occurs sequentially in response to rotations of said valve spindle such that said rotary valve provides at least twelve complete switching cycles for every rotation of said valve spindle.

* * * * *